United States Patent
Kumar et al.

(10) Patent No.: US 9,787,564 B2
(45) Date of Patent: Oct. 10, 2017

(54) ALGORITHM FOR LATENCY SAVING CALCULATION IN A PIPED MESSAGE PROTOCOL ON PROXY CACHING ENGINE

(71) Applicant: Cisco Technology, Inc., San Jose, CA (US)

(72) Inventors: Pankaj Kumar, Bangalore (IN); Jitesh Mulchandani, Bangalore (IN); Magesh Babu Nagalingam, Bangalore (IN); Karthik Laxminarayan Bhat, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 344 days.

(21) Appl. No.: 14/450,392

(22) Filed: Aug. 4, 2014

(65) Prior Publication Data
US 2016/0036676 A1    Feb. 4, 2016

(51) Int. Cl.
G06F 15/167    (2006.01)
H04L 12/26    (2006.01)
H04L 29/08    (2006.01)

(52) U.S. Cl.
CPC ...... *H04L 43/0864* (2013.01); *H04L 67/2842* (2013.01)

(58) Field of Classification Search
CPC ............ H04L 43/0864; H04L 67/2842
See application file for complete search history.

(56) References Cited

U.S. PATENT DOCUMENTS

| | | | |
|---|---|---|---|
| 6,625,156 B2 | 9/2003 | Shaio et al. | |
| 6,985,959 B1 | 1/2006 | Lee | |
| 7,051,109 B1 | 5/2006 | Stewart et al. | |
| 7,058,058 B2 | 6/2006 | Singh et al. | |
| 7,200,658 B2 | 4/2007 | Goeller et al. | |
| 7,281,058 B1 | 10/2007 | Shepherd et al. | |
| 7,680,051 B2 | 3/2010 | Kumar et al. | |
| 8,295,277 B2 | 10/2012 | Vadlakonda et al. | |
| 8,964,595 B2 * | 2/2015 | Agarwal | H04W 24/08 370/252 |
| 2002/0049040 A1 | 4/2002 | Sugaya et al. | |
| 2002/0049856 A1 | 4/2002 | Hujber | |
| 2003/0195984 A1 | 10/2003 | Zisapel et al. | |
| 2004/0028009 A1 | 2/2004 | Dorenbosch et al. | |
| 2005/0102427 A1 | 5/2005 | Yokota et al. | |

(Continued)

OTHER PUBLICATIONS

Katz, IP Router Alert Option, pp. 1-4, Cisco Systems, Feb. 1997, http://www.ietf.org/rfc/rfc2113.txt.

(Continued)

*Primary Examiner* — SM Rahman
(74) *Attorney, Agent, or Firm* — Merchant & Gould P.C.

(57) ABSTRACT

Methods and systems for determining latency in a communication network may be provided. A plurality of commands may be sent in the communication network. A response may be received for each of the plurality of commands from the communication network. A pipeline round trip time may be calculated for each of the plurality of commands based on a time of the response for each of the plurality of commands. A total round trip time for the plurality of commands may be calculated based on the calculated pipeline round trip time. A time saving may be calculated for at least one of the plurality of commands serviced locally.

19 Claims, 5 Drawing Sheets

(56) References Cited

U.S. PATENT DOCUMENTS

| | | |
|---|---|---|
| 2007/0118604 A1 | 5/2007 | Costa Requena |
| 2007/0202835 A1 | 8/2007 | Son et al. |
| 2008/0052366 A1 | 2/2008 | Olsen et al. |
| 2008/0170510 A1 | 7/2008 | Singh |
| 2008/0205445 A1 | 8/2008 | Kumar et al. |
| 2008/0222304 A1 | 9/2008 | Sibal et al. |
| 2010/0223513 A1* | 9/2010 | Hesse ............... G11C 29/02 714/719 |
| 2011/0222404 A1* | 9/2011 | Watson ............... H04L 47/14 370/235 |
| 2012/0131309 A1* | 5/2012 | Johnson ............... G06F 9/30 712/41 |
| 2014/0237175 A1* | 8/2014 | Felch ............... G06F 9/3851 711/105 |

OTHER PUBLICATIONS

Tcptraceroute, pp. 1-3, http://michael.toren.net/code/tcptraceroute/.
Table of Contents, TCPTRACEROUTE(8) manual page, pp. 1-3, http://michael.toren.net/code/tcptraceroute/tcptraceroute.8.html.
R. Bonica, et al., ICMP Extensions for MulitProtocol Label Switching, pp. 1-9, Aug. 2000, http://tools.ieti.org/id/draft-ietf-mpls-icmp-02.txt.

* cited by examiner

ALGORITHM FOR LATENCY SAVING CALCULATION IN A PIPED MESSAGE PROTOCOL ON PROXY CACHING ENGINE

TECHNICAL FIELD

The present disclosure relates generally to latency savings, specifically through the usage of a proxy caching engine.

BACKGROUND

A user accessing a computer server across a computer network transmits data across a computer network from the user's computer to the computer server and must also receive data across the computer network from the computer server to the user's computer. Therefore, the user requires fast data transmission rates across the computer network and requires, in particular, fast round trip data transmission across the computer network. However, as computer networks continuously grow in size and complexity, the data transmission rates associated with the larger and more complex computer networks may decrease. Accordingly, a need exists for a method of determining a time delay for the round trip transmission of data.

BRIEF DESCRIPTION OF DRAWINGS

The accompanying drawings, which are incorporated in and constitute a part of this disclosure, illustrate various embodiments of the present disclosure. In the drawings.

DETAILED DESCRIPTION

Overview

In one method embodiment, a plurality of commands may be sent in a communication network. A response may be received for each of the plurality of commands from the communication network. A pipeline round trip time may be determined for each of the plurality of commands based on a time of receipt of the response for each of the plurality of commands. A total round trip time for the plurality of commands may be determined based on the determined pipeline round trip time. A time saving may be determined for at least one of the plurality of commands serviced locally by a caching engine.

EXAMPLE EMBODIMENTS

Disclosed herein are various example embodiments of methods and systems for determining latency in a communication network. For example, a communication network of a business environment may typically include a central data storage at a data center which may provide this data to a plurality of client computing devices over a wide area network (WAN), such as the Internet. These client computing devices (users) may be located at branch offices of the organization. The client devices may be connected to each other and the branch office using a local area network (LAN). Applications running on the client devices may require data from the data center, such as records, files, merchandising data, etc. However, access to information over the WAN may be an order of magnitude slower than access to information over a local area network (LAN), due to limited WAN bandwidth, packet loss, and latency. To mitigate these challenges, proxy caching engines may be deployed at the branch office to serve as an intermediary for requests from the users seeking resources from the data center. Once the proxy caching engine has received the client requests, it may cache the resource for future requests for the resource. In this manner when a user requests that resource, the proxy caching engine may directly provide that resource instead of obtaining the resource from the data center.

Figure 1:
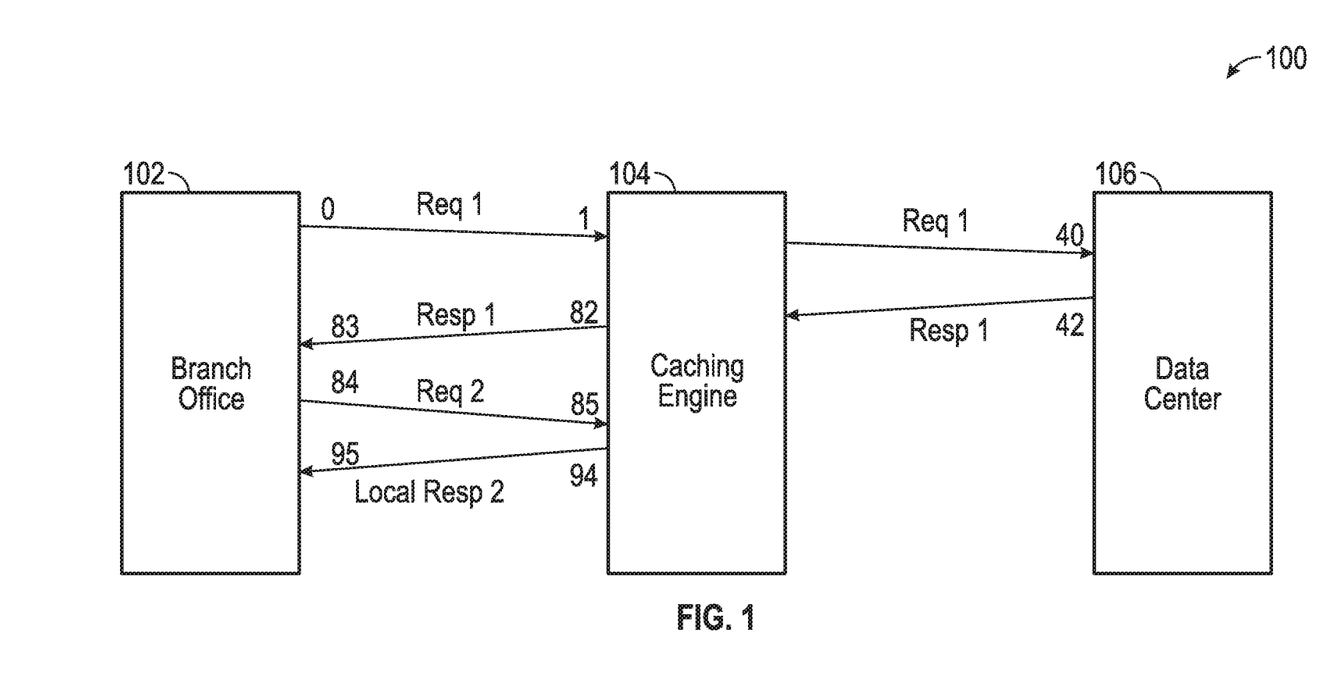
FIG. 1 is a diagram illustrating embodiments of latency determination of a communication network using a SMB version 1 protocol.

FIG. 1 illustrates an exemplary communication network 100 employing the client side caching. As shown in FIG. 1, communication network 100 may include a branch office 102, a caching engine 104 and a data center 106. Branch office 102 may be connected to caching engine 104 over a LAN and to data center 106 over a WAN. Although caching engine 104 is shown to be located separate from branch office 102, caching engine 104 may reside in branch office 102. Caching engine 104 may selectively cache frequently requested information from data center 106. In addition to making cache decisions, caching engine 104 may further determine and publish network latency data for the link between branch office 102 and data center 106. For example, caching engine 104 may determine a real time throughput and latency statistics to showcase value addition in employing the client side caching.

Latency data, for example, may include a round trip time (RTT) and time savings (TS) for communication network 100. The RTT may be defined as a time interval between sending of a command request from branch office 102 and receipt of a response to the command request. Hence, the RTT may be a measure of a network propagation delay, including time spent in gateway queues and time spent in processing the command at a receiver and a sender in communication network 100. If the command is serviced locally by caching engine 104, a significant amount of time may be saved. For example, data center 106 may be located few thousand miles away from the user. Hence, the time spent in forwarding the command request to data center 106 and receiving the response back from data center 106 may be saved. The TS for communication network 100 may be determined by determining a difference in the RTT value when the command request is serviced by data center 106 and the RTT value when the command request is serviced locally by caching engine 104.

In one embodiment, the RTT and the TS for communication network 100 may be determined by sending a plurality of command requests requesting information, receiving response for the plurality of command requests, and analyzing a timeline associated with the response. The plurality of command requests may be sent using a messaging protocol such as an application layer protocol. An example of the application layer protocol may include a server message block (SMB) protocol. FIG. 1 illustrates the timeline associated with the plurality of commands sent in communication network 100 using SMB version 1 (SMBv1) protocol. For example, a first command (shown as Req1)

may be generated by branch office 102 and sent to caching engine 104. Req1 may be received by caching engine 104. Caching engine 104 may process Req1 to determine whether Req1 may be serviced locally. In response to the determination that Req1 may not be serviced locally, caching engine 104 may forward the Req1 to data center 106. Data center 106 may receive the Req1 from caching engine 104 and process the received Req1 to generate a response. The generated response may be sent back to caching engine 104. Caching engine 104 may receive the response from data center 106 and forward to branch office 102.

As shown in FIG. 1, it may take 1 millisecond for the Req1 to travel from branch office 102 to caching engine 104. Further, it may take 40 milliseconds for the Req1 to travel to data center 106. Data center 106 may take 2 milliseconds to process and generate a response. The generated response for the Req1 may be sent by data center 106 at 42 milliseconds and may be received at caching engine 104 at 82 milliseconds. Caching engine 104 may forward the received response to branch office 102. The response for the Req1 may finally be received at branch office 102 at 83 milliseconds.

Because of inherent characteristics of the SMBv1 protocol, a second command (shown as Req2 in FIG. 1) may only be generated after the receipt of the response for the first command. For example, and as shown in FIG. 1, Req2 is generated at 84 milliseconds and is sent to caching engine 104. Caching engine 104 may receive Req2 at 85 milliseconds and process the Req2 to determine whether the Req2 may be serviced locally by caching engine 104. Since the information requested by the Req2 may already be cached at caching engine 104 in response to the Req1, caching engine 104 may service the Req2 locally. Caching engine 104 may process Req2 in 9 milliseconds and generate a response at 94 milliseconds. The generated response may be sent to branch office 102. Branch office 102 may receive the response for the Req2 at 95 milliseconds. Form the above timelines, a total RTT and the TS for communication network 100 may be determined as:

$$RTT=(82-1)+(94-85)=90 \text{ milliseconds}$$

$$TS=(80-9)=71 \text{ milliseconds}$$

As SMBV1 protocol does not support pipelining, branch office 102 may have to wait for the response for the first command request before being able to send a second subsequent command request. As a result, the RTT and the TS values determined using the SMBv1 protocol may not truly reflect the latency of communication network 100. For example, an idle time of caching engine 104 between 82 milliseconds and 85 milliseconds, is accounted in the RTT value. To overcome these drawbacks, messaging protocols which may support multiple command requests may be used to determine the latency of communication network 100. For example, messaging protocols, such as SMB version 2 (SMBv2) protocol, which supports the request pipelining and compound requests, may be used. The request pipelining may allow sending multiple command requests in a pipeline without waiting for previous responses. The compound requests may allow sending multiple command requests under one NETBIOS header. An example illustration of the timeline associated with the plurality of command requests sent using SMBv2 protocol in communication network 100 is shown in FIG. 2.

Figure 2:
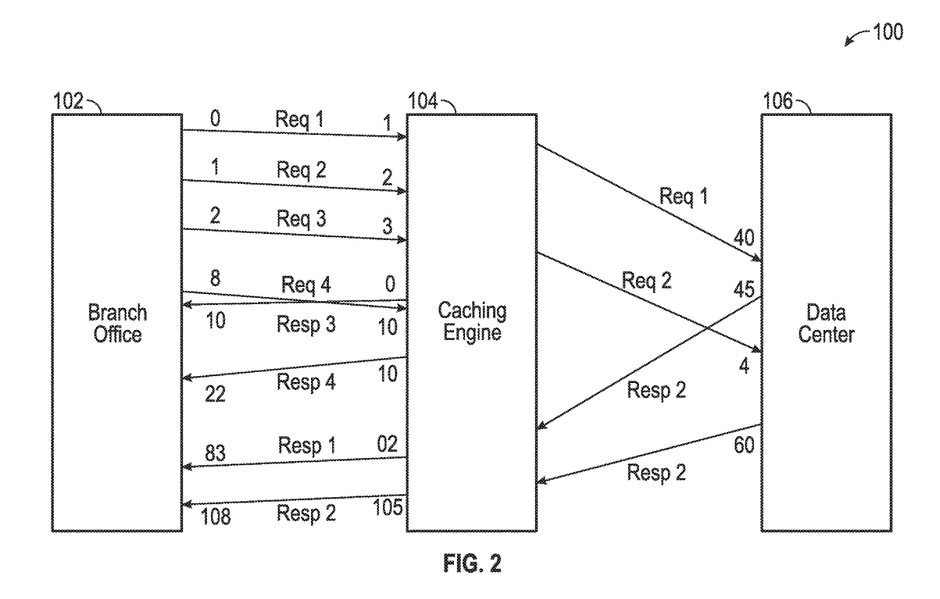
FIG. 2 is a diagram illustrating embodiments of latency determination of a communication network using a SMB version 2 protocol.

As shown in FIG. 2, a first command request (Req1) in the pipeline may be generated at branch office 102 at 0 milliseconds and sent to caching engine 104. Without waiting for a response to the Req1, a second command request (Req2) may be generated at 1 millisecond. Furthermore, a third command request (Req3) and a fourth command request (Req4) may be generated at 3 milliseconds and 8 milliseconds, respectively. The generated command requests may be sent to caching engine 104. Caching engine 104 may receive the Req1 and the Req2 at 1 millisecond and 2 milliseconds, respectively. Caching engine 104 may process the Req1 and the Req2 to determine whether the command requests Req1 and Req2 may be serviced locally. Since the Req1 and the Req2 may not be serviced locally, caching engine 104 may forward the Req1 and the Req2 to data center 106. The Req1 and the Req2 may be received at data center 106 at 40 milliseconds and 47 milliseconds, respectively. Data center 106 may process and respond to the Req1 and the Req2 at 45 milliseconds and 60 milliseconds, respectively.

Caching engine 104 may receive the Req3 and the Req4 at 3 milliseconds and 10 milliseconds, respectively. Caching engine 104 may process the Req3 and the Req4 to determine whether the command requests Req3 and Req4 may be serviced locally. Upon the determination that the Req3 and the Req4 may be serviced locally, caching engine 104 may process and generate responses for the Req3 and the Req4 at 8 milliseconds and 18 milliseconds, respectively. The generated response may be forwarded to branch office 102. Branch office 102 may receive the responses for the Req3 and the Req4 at 10 milliseconds and 22 milliseconds, respectively.

The Req1 and the Req2 may be received at data center 106 at 40 milliseconds and 47 milliseconds, respectively. Data center 106 may process and generate responses for the Req1 at 45 milliseconds and for the Req2 at 60 milliseconds. The generated responses from the command requests Req1 and Req2 may be forwarded to caching engine 104. Caching engine 104 may receive the responses for the Req1 and the Req2 at 82 and 105 milliseconds, respectively. Caching engine 104 may forward the responses to branch office 102 at 82 milliseconds and 105 milliseconds, respectively. Branch office 102 may receive the responses for the Req1 and the Req2 at 83 milliseconds and 108 milliseconds, respectively. From the above timelines, the latency for the communication network may be determined as:

$$\text{Total } RTT=(8-3)+(18-10)+(82-1)+(105-2)=197 \text{ Milliseconds}$$

$$\text{Total } TS=(80-5)+(80-8)=147 \text{ Milliseconds}$$

Theoretical $RTT=(105-1)=104$ Milliseconds=89.42% Error(Total operational time, Sum of all durations in which one or more response(s) are pending)

Theoretical $TS$~96 Milliseconds=53.12% Error(Theoretical $RTT$ when traffic is not optimized– Theoretical $RTT$ when there is traffic is optimized)

As mentioned above, the latency for communication network 100 determined using pipelined protocol (i.e., SMBv2 protocol) and traditional methods may show significant errors. For example, the traditional methods determine the RTT by determining a difference between a time when a command request is sent from caching engine 104 and a time then a response for the command request is received at caching engine 104. An average of the RTT is then determined over multiple requests. Similarly, the TS is determined by number of locally services requests multiplied with the average RTT. Such traditional methods of determining latency may hold good for non-pipelined protocol, such as the SMBv1. But, if the same methods are applied in the pipelined protocols, such as SMBv2, it may result in large error in the latency calculations. For example, the error between the total RTT and theoretical RTT for the pipeline is 89.2%. Similarly, the error between the total TS and theoretical TS for the pipeline is 53.2%. In addition, the total TS for the pipeline as determined above is 147 milliseconds, which is more than even the theoretical RTT, indicating that there was more time savings than the overall processing time, which may theoretically not be possible. In case of long pipelines, such as with 1000 requests or more, the errors may increase exponentially. These errors in the RTT and the TS determinations may be attributed to: failure to incorporate delays in caching engine 104, lack of activity at network equipment for the duration of the pipeline, command dependencies, or queuing at caching engine 104 and data center 106, etc.

In one embodiment, the present disclosure provides methods and systems for determining latency in communication network 100. More specifically, the embodiment provide methods and systems to determine the RTT and the TS taking into account the wait time on network devices, pipeline delays, and command dependencies. For example, a plurality of variables and flags may be used to keep track of the delays and the dependencies while processing the commands in the communication network. The delays and the dependencies may be included in the RTT and the TS determinations for the pipeline. For example, an outstanding commands (OC) variable may be used to keep a count of a number of pending responses for command requests in the pipeline. The count for the OC variable may be incremented when a command request is received at caching engine 104. For a compound command request, the count for the OC variable may be incremented by a number of commands in the compound command request. The count for the OC variable may be decremented when a response for a command request is received. The OC variable may be maintained per SMB session.

An inactive period (IP) flag may be used to track pending active responses in the pipeline. The IP flag may be a Boolean flag. For example, the Boolean flag, if set to False, may indicate that there are one or more pending responses in the pipeline. The IP flag may be set to True as soon as the count for the OC variable hits zero. Other variables may include a First Request Time After Inactive Period (FRTAIP), a Pipeline Round Trip Time (PRTT), a Last Response Time (LRT), a Local Response (LR) flag, a Total un-optimized Round Trip Time (URTT), a Request Dependent time saving (DTime), and a Pipeline Time Savings (PTS).

The FRTAIP variable may store a time when a first command request comes in flow after an inactive period (IP). For example, the FRTAIP variable may store a current time corresponding to the receipt of the first command request. The IP flag may be set to False when the first command request is received at caching engine 104. The PRTT variable may store a total round trip time since the first command request in a current pipeline. The LRT variable may store a current time when a response is received. The LRT variable hence may be updated on receipt of each response in the current pipeline. The LR variable may also be a Boolean flag and may indicate if the response received is a local response. For example, a True value for the LR variable may indicate the response was generated locally by caching engine 104. Similarity a False value for the LR variable may indicate that the response was generated by data center 106.

A pseudo code for a method for determining the RTT using the above defined variables for communication network 100 may be provided as:
On Receiving Request
OC=OC+1
If IP is true
FRTAIP=current_time
IP=false
On Receiving Response
OC=OC−1
If OC==0
IP=true
newPRTT=current_time−FRTAIP
RTT=RTT+(newPRTT−PRTT)
PRTT=newPRTT As disclosed in the pseudo code for determining the RTT, at a start of the method, the OC counter may be set at zero to indicate that there are no pending responses in the pipeline. Similarly, the IP flag may be set to True to indicate an inactive period. Upon receipt of a first command request, the OC counter may be incremented by 1 to indicate one outstanding command request. In addition, a current time as of the receipt of the first command request may be recorded as the FRTAIP and a value of the IP flag may be changed from True to False to indicate outstanding response. The OC counter may further be incremented upon receipt of any subsequent command requests.

Upon receipt of a first response, the OC counter may be decremented by 1. In addition, a PRTT for the first response may be determined. The PRTT may be determined as a difference between a time of receipt of the first response and the FRTAIP. In addition, a total RTT for the pipeline may be updated on receipt of the first response. The total RTT for the pipeline may be updated by aggregating a difference of the newly calculated PRRT and the previous PRTT into the total RRT. After updating the total RTT for the pipeline, the new PRRT may be labeled as previous PRRT.

Upon the receipt of a second response, the OC variable may further be decremented by 1 and a new PRTT corresponding to the second response may be determined. After determining the new PRRT, the total RTT for the pipeline may be updated using the new PRRT. This cycle may be repeated until the OC variable count is decremented to be zero. Hence, using the SMBv2 protocol of FIG. 2, and the method disclosed in the pseudo code, the total RTT for the pipeline may be computed as:

$$RTT=(8-1)+(18-8)+(82-18)+(105-82)=104 \text{ Milliseconds}$$

The RTT for communication network 100, determined using the disclosed method is same as the theoretical RTT (104 milliseconds). Hence, the disclosed embodiments may provide 100% accuracy in determination of the RTT. Since the response time for the command requests may be effected by short term transient behaviors of communication network 100, the RTT values may be averaged over a predetermine window size. For example, a window size for averaging the RTT values may be determined based on congestion in communication network 100, working conditions of the network components, characteristics of the command requests, load on data center 106, processing capability of caching engine 104, etc.

Figure 3:
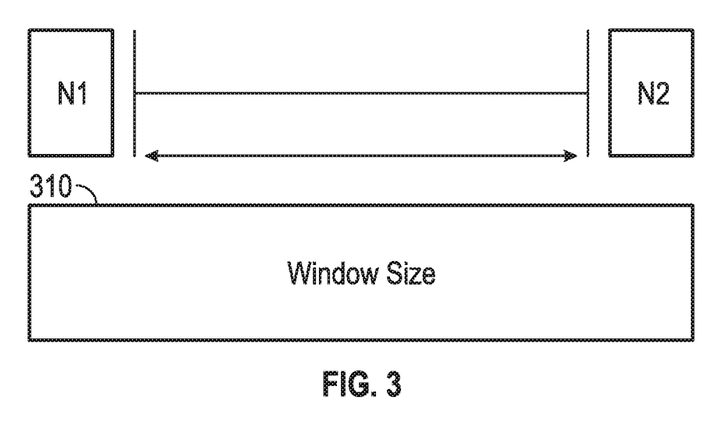
FIG. 3 is a diagram illustrating embodiments of determination of a window size for determining latency of a communication network.

An example illustration of determining window size 310 is illustrated with respect to FIG. 3. As shown in FIG. 3, a minimum number of command requests (N1) which may be handled in time T1 and a maximum number of command requests (N2) which may be handled in time T2 may be defined. The N1 and the N2 values may be defined based on type of command requests being used for the latency calculations and congestion in communication network 100. For example, number of the command requests per second which may be handled by caching engine 104 may be determined as: (1/(ALRT−AVG_IO_WAIT)), where ALRT is average local response time.

In one embodiment, N(T) which may represent a number of command requests which may be handled in time T, may be provided as:

$$|N(T), N1<=N(T)<=N2$$

$$N=|N1, N(T)<N1$$

$$|N2, N(T)>N2$$

where

N2 is number of SMB requests which can be handled in T2

N1 is number of SMB requests which can be handled in T1

As discussed previously, a response time for commands in communication network 100 may depend on various transient network conditions. To deter the effect of short term oscillations in the network conditions, the RTT values may be averaged over the predetermined window size. For example, the RTT values may be averaged over a sliding window size of a predetermined number of command requests or responses. Similarly, the ALRT and the ARRT values may also be averaged over the predetermined window size. Ring buffers may be used to determine the average. For example, a local ring buffer may store the local response time values and a remote ring buffer may store the remote response time values. The size of the ring buffers may be determined based on the window size for the latency calculations. When a response time is received, a presence of the LR flag in the response may be checked. If the LR flag is present in the received response, then the response time is added to the local ring buffer. If there is no LR flag associated with the response time, then it is added to the remote ring buffer.

In addition to the variables defined for calculating the RTT, additional variables, such as an URTT variable and a DTime variable, may be defined to determine the TS. The URTT variable may store the total round trip time assuming that the network connection is not optimized yet. The DTime variable may store time savings when a request dependency is present. The request dependency may be governed by whether the next request is dependent on the previous response. The DTime variable may further depend on protocol and version of the protocol used for the calculations. For example, in SMBv2.1 protocol, the request dependency may be credit based.

In some embodiment, the time savings (TS) for communication network 100 may be determined based on a local response time (LRT) and an average remote response time (ARRT). The TS may further be based on time delays in the pipeline because of the request dependency. For example, the method for determining the TS disclosed herein may keep track of delays experienced by the commands because of their dependencies on other commands with pending response.

A pseudo code for method of determining the TS for a pipeline may be provided as:

If LR is true
URTT=Max(Request Time+ARRT−FRTAIP, PRTT)
If request_dependent_on_previous_response
newDTime=Max(ARRT−ART, 0)
newPTS=newPTS+(URTT−RTT+DTime)
TS=TS+(newPTS−PTS)+(newDTime−DTime)
PTS=newPTS
newDTime=DTime The TS value in the pipeline is determined for a local response that is for the response with associated LR flag value set to True. Hence the method may start with a determination of a value of the LR flag associated with each of the received response. If the value of the LR flag is true, then the TS for the pipeline may be determined in two steps. The first step in determining the TS may include determining the URTT for the response. The URTT may be determined by aggregating an average remote response time (ARRT) with a difference between a request time for the command request and the first request time after inactive period (FRTAIP). The URTT for the response may then be determined as a maximum of the aggregate and the PRTT for the command.

The second step in determining the TS may include factoring the delay in the response because of interdependencies in the command requests. For example, if a present command request is dependent on a previous response, a request dependence time (DTime) for the current command request may be determined. The DTime may be determined as a maximum of a difference between the ARRT and an actual response time (ART), and zero. After determining the Dtime for the response, a new value of pipeline time saving (newPTS) may be determined. The newPTS may be determined by determining a difference between the URTT and the RTT, and aggregating the determined difference with the determined DTime for the response. The determined aggregate may be added to the old PTS to determine the newPTS for the pipeline. After calculating the newPTS and the newDtime, the TS for the pipeline may be updated using the newPTS and the newDtime values. For example, the TS for the pipeline may be updated by adding to the previous TS, a difference between the newPTS and previous PTS, and a difference between the newDtime and the previous DTime. Above steps may be repeated for each received local response, till the last response in the current pipeline. By employing the method as represented by the pseudo code, the TS for the pipeline described with respect to FIG. 2, may be calculated to be 90 milliseconds, which is 93.75% accurate. The above pseudo codes may be implemented in a computer system to determine the latency of communication system 100. For example, FIG. 4 shows a system 400 for computing the latency data for a communication network.

Figure 4:
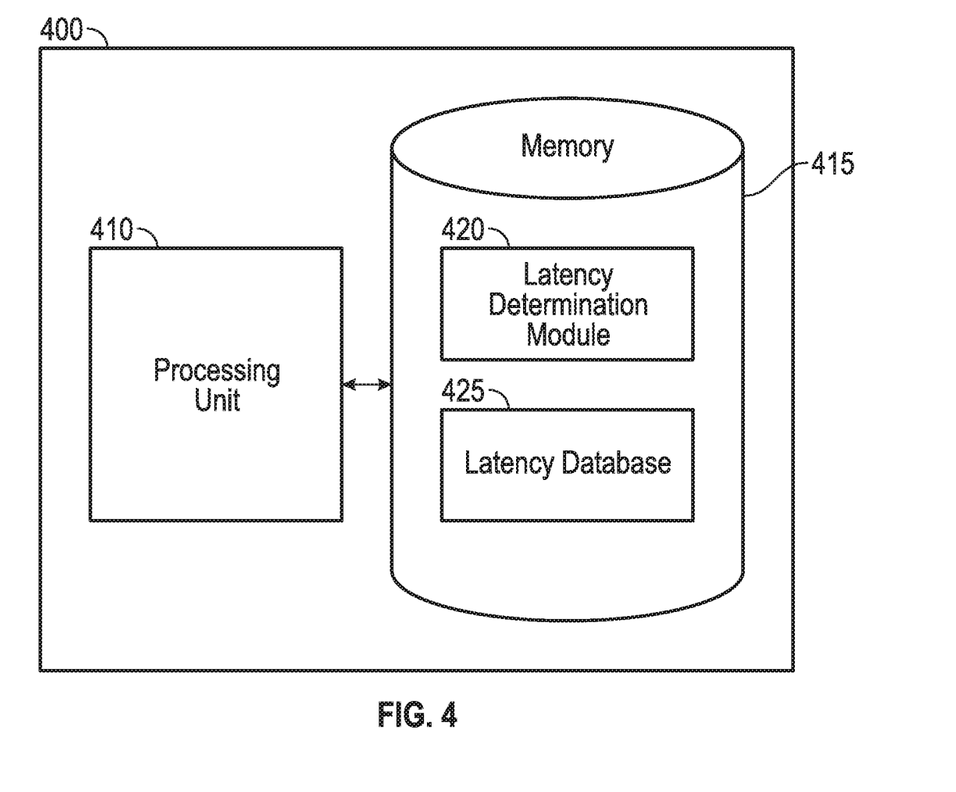
FIG. 4 is a diagram of system for determining a latency of a network connection.

As shown in FIG. 4, system 400 may include a processing unit 410 and a memory unit 415. Memory 415 may include latency determination module 420 and a latency database 425. While executing on processing unit 410, latency determination module 420 may perform processes for providing latency data, including, for example, the RTT, the TS, the ARRT, the ALRT, etc. in one or more stages included pseudo codes described above and in method 500 described below with respect to FIG. 5. Furthermore, latency determination module 420 and latency database 425 may be executed on or reside in branch office 102, caching engine 104, or a computer system connected to the communication network. Moreover, any of one or more of the stages included in method 500 may be performed on any element shown in FIG. 1 including, but not limited to, branch office 102 and caching engine 104.

System 400 may be implemented using a personal computer, a network computer, a mainframe, or other similar microcomputer-based workstation. The processor may comprise any computer operating environment, such as handheld devices, multiprocessor systems, microprocessor-based or programmable sender electronic devices, minicomputers, mainframe computers, and the like. The processor may also be practiced in distributed computing environments where tasks are performed by remote processing devices. Furthermore, the processor may comprise a mobile terminal, such as a smart phone, a cellular telephone, a cellular telephone utilizing wireless application protocol (WAP), personal digital assistant (PDA), intelligent pager, portable computer, a hand held computer, a conventional telephone, a wireless fidelity (Wi-Fi) access point, or a facsimile machine. The aforementioned systems and devices are examples and the processor may comprise other systems or devices.

Figure 5:
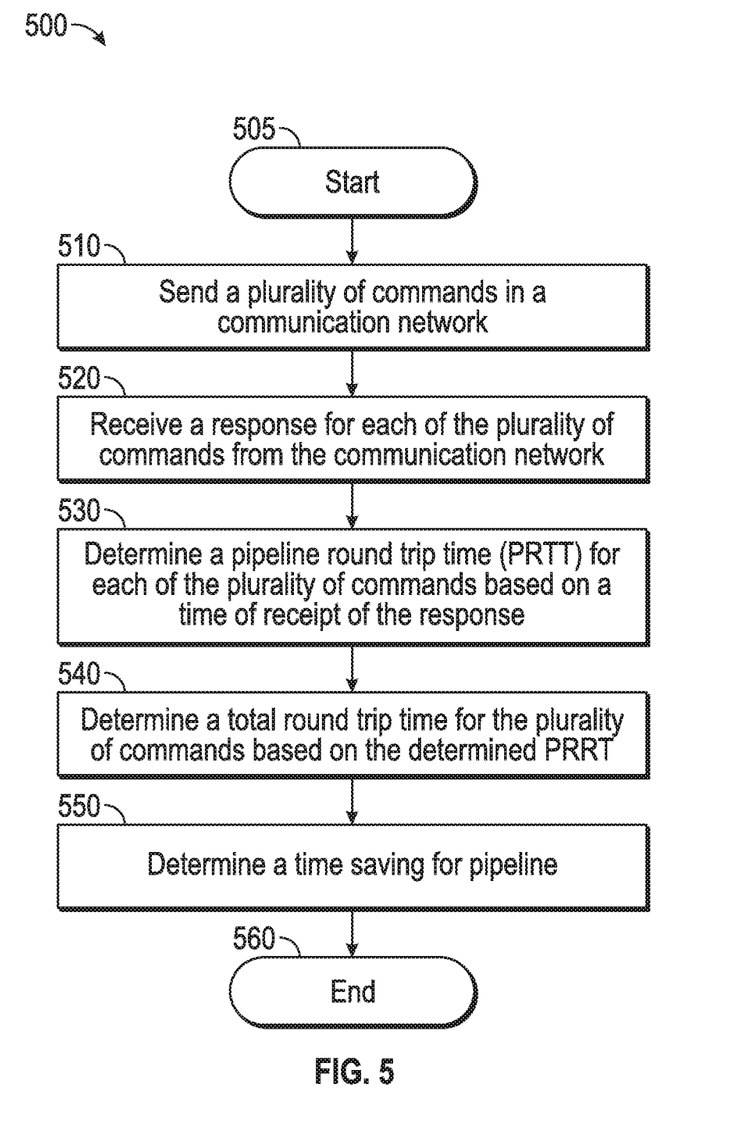
FIG. 5 is a flow diagram illustrating a method for determining a latency of a network connection.

FIG. 5 is a flow chart setting forth the general stages involved in a method 500 consistent with an embodiment of the disclosure for determining the latency in the communication network. Method 500 may be implemented using system 400 as described with respect to FIG. 4 above. Ways to implement the stages of method 500 will be described in greater detail below. The outcome from the one or more stages of the method 500 may be displayed on a display device connected to system 400 or provided to an output means using an output interface of system 400. For example, the latency data, such as the RTT and the TS, determined by system 400 may be printed on paper or sent electronically to another system for further analysis.

Method 500 may begin at starting block 505 one or more variables may be initiated. For example, at initiation of method 500, the OC counter may be set at zero to indicate that there are no pending responses in the pipeline, and the IP flag may be set to True to indicate an inactive period. After initiation at step 505, the method 500 may proceed to stage 510 where a plurality of command requests may be generated. For example, a plurality of read commands may be generated for performing read operations on one or more files located on remote server 106. The plurality of command requests may be generated by an application running on branch office 102 or a user at branch office 102. Upon generation of each of the plurality of command requests the OC variable may be incremented by 1 to reflect the number of pending command requests in the pipeline.

In one embodiment, the plurality of command requests may be received at the closest router in communication network 100. For example, the plurality of command requests may be received at a router associated with branch office 102. The router may forward the plurality of command requests to caching engine 104. If there is no caching engine 104 in branch office 102, the router may forward the plurality of command requests to data center 106. The plurality of command requests may reach data center 106 hopping through various network devices.

Caching engine 104 may determine whether any of the plurality of command requests may be serviced locally. In response to the determination, caching engine 104 may process and generate a response for each of the plurality of command requests which may be serviced locally. Caching engine 104 may forward the generated response to branch office 102. In addition, for each of the plurality of commands serviced locally, caching engine 104, may set a LR flag associated with the response to True. The rest of the plurality of commands may be forwarded to data center 106.

Data center 106 may receive the plurality of commands either directly from branch office 102 or from caching engine 104. Data center 106 may process the received plurality of commands and generate a response for each of them. Data center 106 may forward the generated response to caching engine 104 or branch office 102. If the response is sent to caching engine 104, caching engine 104 in turn may forward it to branch office 102. For all the responses generated by data center 106, the LR flag may be set to False.

After sending the plurality of commands at step 510, the response for the plurality of commands may be received at step 520. For example, branch office 102 may receive the response for the commands from data center 106 and/or caching engine 104. Upon receipt of each response, a time of receipt of the response may be recorded and the OC variable for the pipeline may be decremented by 1.

After receiving the response for the plurality of commands at step 520, system 400 may at step 530, determine a pipeline round trip time (PRTT) for each of the received response. For example, system 400 may determine the PRTT for the first response by subtracting the FRTAIP from the time of receipt of the first response. Similarly, system 400 may determine the PRTT for each of the received response. For example, and as described with respect to the pseudo code for determining the RTT, the PRTT for a response may be determined by subtracting the FRTAIP from the time of receipt of the response.

After determining the PRTT at step 530, method 500 at step 540, may determine a total RTT for all the commands in the pipeline. For example, system 400 may aggregate the PRTT for each of the commands to determine the total PRTT for the pipeline. System 400 may further determine a window size and determine an average of the RTT on the determined window size.

Once, the total RTT for the pipeline has been determined at stage 540, method 500 may proceed to step 550, where the TS for the pipeline may be determined. For example, system 400 may determine the TS for the pipeline by determining the TS for the commands which were serviced locally by caching engine 104. System 400 may determine the TS in two stages. For example, for each received response, system 400 may check the LR flag to determine whether it is a local response. For each local response, system 400 may determine the URTT. In addition, if the command request was dependent on a previous response, system 400 may determine the newDtime. After determining the URTT and newDtime, system 400 may determine newPTS for the response based on the determined URTT and the newDtime. System 400 then may determine the TS for the response based on the determined newPTS and the newDtime. After determining the TS for the pipeline, method 500 may end at step 560. For example, method 500 may stop when a value of the OC variable is zero indicating that there are no more pending responses in the pipeline.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
  sending, from a first location, a plurality of commands in a communication network, wherein sending the plurality of commands comprises:
   determining a first request time after inactive period (FRTAIP) comprising a first request time when a first command or the plurality of commands is sent, and
   incrementing an outstanding command (OC) counter in response to sending the first command;
  receiving a first response corresponding to the plurality of commands from the communication network, wherein receiving the first response comprises:
   decrementing the OC counter in response to receiving the first response,
   determining a first pipeline round trip time (PRTT) based on a first response time associated with receipt of the first response and the first FRTAIP, and
   determining a total round trip time for the plurality of commands of a pipeline based on the first determined PRTT;
  receiving a second response from the communication network, wherein receiving the second response further comprises:
   decrementing the OC counter in response to receiving the second response,
   determining a second PRTT based on a second response time associated with receipt of the second response, and
   updating the total round trip time for the plurality of commands of the pipeline by aggregating to the total round trip time a difference between the second PRTT and the first PRTT; and
  determining whether to employ a local caching at the first location associated with the plurality of commands based on the updated total round trip time.

2. The method of claim 1, wherein determining the first PRTT comprises determining a difference between the first response time and the first request time after inactive period (FRTAIP).

3. The method of claim 1, wherein determining the total round trip time comprises:
  determining the total round trip time (RTT) as a difference between the first PRTT of the first response and the first FRTAIP.

4. The method of claim 1, further comprising determining a window size from the plurality of commands.

5. The method of claim 4, wherein determining the window size comprises a minimum number of commands and a maximum number of commands for the pipeline.

6. The method of claim 4, further comprising determining an average of the round trip time in the window size.

7. The method of claim 1, further comprising:
  employing local caching; and
  determining a time saving for the pipeline in response to employing the local caching.

8. The method of claim 7, wherein the time savings for the pipeline is determined by identifying a portion of the plurality of commands serviced by the local caching.

9. The method of claim 7, wherein the portion of the plurality of commands serviced by the local caching identified based on a flag attached with one or more responses received from the communication network.

10. An apparatus comprising:
  a memory storage; and
  a processing unit coupled to the memory storage, wherein the processing unit is operative to:
   generate, from a first location, a plurality of commands for the communication network, wherein the processing unit being operative to generate the plurality of commands comprises the processing unit being operative to:
    determine a first request time after inactive period (FRTAIP) comprising a first request time when a first command of the plurality of commands is sent, and increment an outstanding command (OC) counter when the first command is sent, receive a first response from the communication network for one of the plurality of commands, wherein the processing unit being operative to receive the first response further comprises the processing unit being operative to:

decrement the OC counter in response to receiving the first response, determine a first pipeline round trip time (PRTT) based on a first response time associated with receipt the first response, and determine a round trip time for a pipeline based on the first PRTT of the first response and the first FRTAIP; and receive a second response from the communication network for another one of the plurality of commands, wherein the processing unit being operative to receive the second response further comprises the processing unit being operative to:

decrement the OC counter in response to receiving the second response, determine a second PRTT based on a second response time associated with receipt of the second response, and update the round trip time for the pipeline by aggregating to the total round trip time a difference between the second PRTT and the first PRTT; and determine whether to employ a local caching at the first location associated with the plurality of commands based on the updated total round trip time.

11. The apparatus of claim 10, wherein the processing unit is operative to update the round trip time for the pipeline based on the first PRTT by:

determining a difference between the second PRTT of the second respond and the first PRTT of the first response; and aggregating the determined difference with the round trip time of the pipeline.

12. The apparatus of claim 10, wherein the processing unit is operative to determine a time savings for the pipeline.

13. The apparatus of claim 12, wherein the processing unit is operative to determine the time savings from a portion of the plurality of commands serviced by the local caching.

14. The apparatus of claim 13, wherein the processing unit is operative to determine the portion of the plurality of commands serviced by the local caching based on a flag attached with at least one response.

15. The apparatus of claim 10, wherein the processing unit is further operative to determine a window size from the plurality of commands.

16. The apparatus of claim 15, wherein the window size comprises a minimum number of commands and a maximum number of commands for the pipeline.

17. The apparatus of claim 15, wherein the processing unit is further operative to determine an average of the round trip time in the window size.

18. A non-transitory computer readable medium which stores a set of instructions which when executed performs a method executed by the set of instructions comprising:

generating, from a first location, a plurality of commands for the communication network, wherein sending the plurality of commands further comprises:

determining a first request time after inactive period (FRTAIP) comprising a first request time when a first command of the plurality of commands is sent, and incrementing an outstanding command (OC) counter when the first command is sent;

receiving a first response from the communication network for one of the plurality of commands, wherein receiving the first response farther comprises:

decrementing the OC counter in response to receiving the first response, determining a first pipeline round trip time (PRTT) based on a first response time associated with receipt the first response, and determining a round trip time for the pipeline based on the first PRTT of the first response and the first FRTAIP; and receiving a second response from the communication network for another of the plurality of commands, wherein receiving the second response further comprises:

decrementing the OC counter in response to receiving the second response, determining a second PRTT on a second response time associated with receipt the second response, and updating, the round trip time for the pipeline by aggregating to the total round trip time a difference between the second PRTT and the first PRTT; and determine whether to employ a local caching at the first location associated with the plurality of commands based on the updated total round trip time.

19. The non-transitory computer readable medium of claim 18, wherein the first PRTT of the first response is determined as a difference between the first response time and the first request time after inactive period (FRTAIP).

* * * * *